United States Patent

Togino

[11] Patent Number: 5,790,312
[45] Date of Patent: Aug. 4, 1998

[54] OPTICAL SYSTEM

[75] Inventor: Takayoshi Togino, Koganei, Japan

[73] Assignee: Olympus Optical Co., Ltd., Tokyo, Japan

[21] Appl. No.: 823,247

[22] Filed: Mar. 24, 1997

[30] Foreign Application Priority Data

Mar. 25, 1996 [JP] Japan ................................ 8-068191

[51] Int. Cl.$^6$ .................................................. G02B 27/14
[52] U.S. Cl. ............................ 359/631; 359/633; 359/868
[58] Field of Search .............................. 359/630, 631, 359/633, 850, 857, 858, 859, 868, 567, 558, 566; 250/221, 226

[56] References Cited

U.S. PATENT DOCUMENTS

| | | | |
|---|---|---|---|
| 4,026,641 | 5/1977 | Bosserman et al. | 359/869 |
| 5,093,567 | 3/1992 | Staveley | 250/221 |
| 5,303,085 | 4/1994 | Rallison | 359/631 |
| 5,379,157 | 1/1995 | Wang | 359/868 |
| 5,453,877 | 9/1995 | Gerbe et al. | 359/633 |
| 5,642,227 | 6/1997 | Rallison | 359/631 |

FOREIGN PATENT DOCUMENTS 687 932   12/1995   European Pat. Off. .
2-297516  12/1990   Japan .
3-101709   4/1991   Japan .

*Primary Examiner*—Loha Ben
*Attorney, Agent, or Firm*—Cushman Darby & Cushman IP Group of Pillsbury Madison & Sutro LLP

[57] ABSTRACT

The invention relates to an optical system which is compact and light in weight with well corrected aberrations, and is suitable for use on an image display device designed to form no intermediate image, and an optical system best usable as an ocular optical system for use on a head- or face-mounted image display device. This optical system comprises an optical element 7 and a diffraction optical element 8 that are mutually decentered. Optical element 7 comprises at least three juxtaposed optical surfaces, at least one of which is constructed of a curved surface. Between the optical surfaces at least two reflections occur. Spaces between the optical surfaces are filled with a medium having a refractive index greater than 1. A light ray emerging from an image display element 6 is incident on the optical system and upon transmission through a first transmitting surface 5 of optical element 7 located in opposition thereto, is reflected at a first reflecting surface 3 and at a second reflecting surface 4, so that the light ray is guided to an eyeball of an observer upon transmission through a second transmitting surface 3.

18 Claims, 12 Drawing Sheets

OPTICAL SYSTEM

BACKGROUND OF THE INVENTION

The present invention relates generally to an optical system, and more particularly to compact image-forming and ocular optical systems having a wide angle of field as well as an improved resolving power.

In recent years, a helmet or goggles type of head- or face-mounted image display devices have been developed for virtual reality purposes or with a view to allowing individuals to enjoy wide-screen views.

For instance, JP-A-2-297516 discloses an optical system made up of a 2D display device 21 for displaying images, an objective collimating lens 22 and a parallel transparent plate 13 having off-axis paraboloidal mirrors on both its ends, as shown in FIG. 21. Light rays leaving the 2D display device 21 for displaying images are converted by the objective collimating lens 22 into parallel rays, which are then subjected to first transmission through a parallel surface of the parallel transparent plate 23, reflection at the first paraboloidal mirror, some total reflections within the parallel transparent plate 23, reflection at the second paraboloidal mirror, and second transmission through the parallel surface of the parallel transparent plate 23 (8 reflections and 2 transmissions), whereby an intermediate image is formed on a point F for projection into an observer's eyeball 24. U.S. Pat. No. 4,026,641 discloses an optical system wherein, as shown in FIG. 22, an object image displayed on an image display element 25 is converted by an transmission optical element 26 into a curved object image, which is in turn projected from a toric surface 27 into an observer's eyeball.

A problem associated with an image display device of the type wherein an image is relayed therefrom as shown in FIG. 21 is, however, that it needs not only an optical system but also a relay optical system, resulting in increases in the size and weight of the whole optical system as well as an increase in the amount of extension of the whole optical system from a head or face; it is not fit for a head- or face-mounted image display device.

The optical system for forming parallel rays as an intermediate image as well as the optical system for projecting an intermediate image into an eyeball produce some considerable aberrations because it is only the paraboloidal mirrors that has power.

The ocular optical system composed only of a concave mirror as shown in FIG. 22, too, produces some considerable aberrations and so is detrimental to image quality, even though the concave mirror is defined by a toric surface as shown in FIG. 22. To make correction for field curvature occurring at the ocular optical system, therefore, it is required to use the transmission optical element 26 such as a fiber plate. Even by use of the transmission optical system 26 and toric surface 27, however, it is impossible to make adequate correction for coma, and other aberrations.

SUMMARY OF THE INVENTION

In view of such problems associated with the prior art as mentioned above, an object of the present invention is to provide an optical system which is compact and light in weight with well corrected aberrations and is suitable for use on an image display device designed to form no intermediate image, and an optical system best usable as an ocular optical system for use on a head- or face-mounted image display device.

To achieve the aforesaid object, the present invention provides an optical system comprising an optical element and a diffraction optical element that are decentered with respect to each other, wherein said optical element comprises at least three juxtaposed optical surfaces, at least one of said at least three optical surfaces being defined by a curved surface, and at least two reflections occurring between said curved surfaces.

In this case, it is desired that a space defined by said at least three surfaces be filled with a transparent medium having a refractive index greater than 1.

It is also preferred that the optical system further includes an image display element having an image-displaying surface, wherein a light ray leaving said image display element enters through a first transmitting surface of said optical element located in opposition to said image-displaying surface into said optical system, is reflected at a first reflecting surface thereof and then at a second reflecting surface thereof, and is guided through a second transmitting surface thereof into an observer's eyeball.

An account will now be given of how the optical system of the present invention works when used on an image display device. Even when used on an image-forming optical system, the optical system of the present invention will work in much the same manner as explained below.

The present invention is concerned with an optical system layout needed for locating the optical system in a compact manner.

Making the optical system thin is important for making thin an image display device on which it is used. By making the display device thin it is possible to reduce the moment of inertia even at the same weight, because the center of gravity comes near to the center of an observer's head. In short, the ability of the display device to follow the movement of the observer's head is much more improved.

According to the present invention, therefore, there is provided an optical system designed to project an image from an image display device directly into an observer's eyeball without recourse to any relay optical system.

According to the present invention, the optical system can successfully be made thin by allowing light rays to reciprocate therein, thereby defining a turn-back optical path.

It should here be noted that only by use of the turn-back optical path it is impossible to achieve a wide-enough viewing angle. For this reason, it is essentially important that at least one reflecting surface be defined by a curved surface concave on a pupil position side of the optical system, and that light rays be reflected at and converged by that curved surface and, at the same time, they are subjected to repetitive reflections within the optical system.

A key point to the present invention consists in making use of the diffraction optical element so as to make much better correction for aberrations remaining in the optical system having the aforesaid construction. Upon incident on the diffraction optical element, light rays are refracted by the diffraction action of a diffracting surface formed on a thin substrate thereof. This is of very importance for fabricating a compact and light optical system. Refraction optical elements of glass, i.e., ordinary glass lenses are very heavy, but a diffraction optical element can be made in a very thin substrate form. Aspheric action for which a high degree of fabrication technology is needed, too, can easily be imparted to that diffraction optical element by changing diffraction grating interstices of the diffracting surface in its radial direction.

To make correction for coma and astigmatism produced at the decentered optical element, it is important that the diffraction optical element, too, be decentered within the same plane of decentration as the decentered optical element. By the decentering of the diffraction optical element it is possible to make much better correction for the aforesaid coma and astigmatism.

It is more important that at least two of at least three optical surfaces be located with their concave surfaces directed to a stop (observer's eyeball) side. By this layout, or by constructing the optical system of two reflecting surfaces, viz., one concave mirror having a concave surface directed to a stop side and another convex mirror having a concave surface directed to the stop side with respect to light rays incident from the stop (back-tracing rays in the case where the optical system is used on an image display device), it is possible to make correction for the curvature of field that the concave mirrors possess. When this layout is applied to a decentered optical system that does not belong to the category of a conventional optical system rotationally symmetric with respect to an optical axis, it is required to take account of two directions, one direction for a plane of decentration in which the optical system is decentered, and the other direction for a plane perpendicular to the stop and the plane of decentration. It is then important that the aforesaid positive and negative layout, that is, the concave and convex surface layout be achieved in one direction of these two directions, in which residual aberrations become large or, in another parlance, weight is placed on the correction of the aberrations.

Most importantly, three or more reflecting surfaces having different powers be used as the at least three juxtaposed optical surfaces, because power dispersion is achievable, and because projection is achievable with the same power yet with more reduced aberrations. It is here to be noted that the "optical surface" means a surface with an optical axis included therein.

If the space defined by the above three surfaces is filled with a medium having a refractive index greater than 1, it is possible to construct the reflecting surfaces of back-surface mirrors, thereby reducing the occurrence of coma, and spherical aberration. This is because back-tracing light rays from the pupil converge refractively upon transmission through the second transmitting surface whereby the diversion of light rays within the optical system is more reduced as compared with an optical system defined by surface mirrors when making sure of the same viewing angle, so that it is possible to reduce aberrations produced at the reflecting surfaces and, at the same time, to make the optical system compact without giving rise to any shading of light rays.

A light ray leaving the image display element is incident on a transparent medium filled in the space defined by at least three surfaces and having a refractive index greater than 1, where it is reflected twice between the first and second reflecting surfaces to define a turn-back optical path. Then, the light ray transmits through the second transmitting surface between the stop and the second reflecting surface, leaves the transparent medium, and transmits through the stop. By this layout it is possible to construct the first and second reflecting surfaces of back-surface mirrors and, hence, to properly locate the concave and convex mirrors at a proper interval. It is thus possible to offset curvature of field, spherical aberration and other aberrations produced at the concave surface against those produced at the convex surface and, hence, keep aberrations in a well-balanced state.

In the present invention, it is desired that an image displayed on the image display element be guided to an observer's eyeball without being formed as an intermediate image. By locating the image display element on the image plane, positioning the pupil of the observer at a stop position, and properly selecting parameters of the optical system, it is possible to provide an image display device that is compact and light in weight, and makes sure of a wide field angle.

If the curvatures of one of at least three optical surfaces within their decentration planes and within planes perpendicular thereto are varied, it is then possible to make correction for astigmatism occurring at the decentered concave mirror.

When the angle of field differs in two directions, viz., longitudinal and lateral directions, the correction of aberrations, too, differs between the direction in which the angle of field becomes small and the direction in which the angle of field becomes large. There is also a difference in the aberrations produced due to decentration between the decentering direction and the non-decentering direction. Depending on how these are combined, the target of making correction for aberrations within these two planes differs. It is thus important that a different curvature be imparted to any one of optical surfaces. The optical surface to be selected differs and changes depending on what state the optical system is used in.

Furthermore, if the curvature of the optical surface within the plane of decentration is different from that within a plane perpendicular thereto, it is then possible to reduce the burden of the diffraction optical element imposed on aberration correction and, hence, to achieve satisfactory aberration correction even when the diffraction optical element is made in a rotationally symmetric form.

If the first reflecting surface and the second transmitting surface are made up of surfaces of the same shape at the same location, it is then possible to facilitate the fabrication of the optical system because the number of surface shapes needed therefor is reduced. Even when the effective areas of the first reflecting surface and the second transmitting surface overlap, light rays can be reflected at and transmitted through them, so that a wide angle of field can be assured.

In the present invention, it is desired that the second reflecting surface be decentered with respect to a principal ray provided that the principal ray emerges from the center of the display surface, and transmits through the eyeball. If the second reflecting surface is located at an angle with the principal ray, it is then possible to set the image plane (display surface) aside the stop (the pupil position of the eyeball), thereby reducing the amount of extension thereof from the stop in the optical axis direction.

If the second reflecting surface is located while it is concave on the stop side, and is more preferably constructed of a back-surface mirror, it then defines a reflecting surface stronger in power than the other surfaces of the optical system. In addition, more satisfactory results are obtainable because of reduced coma, and because the burden of the other surfaces imposed on coma correction is relieved.

Referring here to the properties of a diffraction optical element, it possesses very strong negative dispersion (an Abbe's number of -3.45), as set forth in JP-A-4-214516 filed by the applicant. Therefore, even a diffraction optical element having weak power has a strong ability to make correction for chromatic aberration. When a surface of the optical system that has major refracting power is constructed of a reflecting mirror, it is possible to refract light rays without producing chromatic aberration at all. However, chromatic aberration produced upon transmission through the first and second transmitting surfaces cannot be corrected by the reflecting surfaces, and so remains intact. The chromatic aberration produced upon transmission through the first and second transmitting surfaces is corrected by chromatic aberration produced by the diffraction optical element, so that an image with well corrected chromatic aberration can be obtained through the overall optical system.

When the first reflecting surface and the second transmitting surface constructed of surfaces of the same shape at the same location are used as a combined reflecting surface, they are located such that light rays are incident thereon at an angle exceeding a critical angle. When they are used as a combined transmitting surface, they are located such that light rays are incident thereon at an angle smaller than the critical angle. This makes it possible to reduce light losses and, hence, to obtain an optical system having a reduced F-number.

When the diffraction optical element is located between the optical system and the stop (at the pupil position of an observer's eyeball), its focal length can then be extended. In addition, aberration correction can be performed making use of a diffraction optical element that is easily fabricable due to wide diffraction grating interstices.

When the diffraction optical element is located between the optical system and the image plane (display surface), its effective area can then be reduced. In addition, aberration correction can be performed making use of a diffraction optical element of small size.

Here let f represent the focal length of the diffraction optical element. It is then desired to satisfy condition (1):

$$-0.1 < 1/f < 0.1 (\text{mm}^{-1}) \tag{1}$$

This condition gives a definition of the focal length of the diffraction optical element. At less than the lower limit of −0.1 in this condition, aberrations produced at the diffraction optical element are more under-corrected than those occurring at other optical system; no satisfactory aberration correction is achievable. At more than the upper limit of 0.1, on the other hand, aberrations produced at the diffraction optical element become too large, and so are more over-corrected than those occurring at other optical system.

When the diffraction optical element is located between the optical element and the observer's eyeball, it is desired to satisfy the following condition (2)

$$-0.1 < 1/f < 0.1 (\text{mm}^{-1}) \tag{2}$$

This is the condition set down for locating the diffraction optical element between the optical element and the stop, and gives a definition of the focal length of the diffraction optical element as is the case with condition (1). If this condition is satisfied, satisfactory aberration correction is then achievable because aberrations produced at the diffraction optical element are set off against aberrations occurring at other optical system. Deviations from the upper and lower limits of this condition yield the same results as explained in connection with condition (1).

For aberration correction, it is most desired that the following condition (2)' be satisfied $$-0.05 < 1/f < 0.05 (\text{mm}^{-1}) \tag{2'}$$

When the diffraction optical element is located between the optical element and the image display plane, it is desired that the following condition (3) be satisfied $$-0.05 < 1/f < 0.05 (\text{mm}^{-1}) \tag{3}$$

This is the condition set down for locating the diffraction optical element between the optical element and the image plane, and gives a definition of the focal length of the diffraction optical element as mentioned above. If this condition is satisfied, favorable aberration correction is then achievable because aberrations produced at the diffraction optical element are set off against aberrations occurring at other optical system. Deviations from the upper and lower limits of this condition yield the same results as explained in connection with condition (1).

If an image display element is located on the image plane of the aforesaid optical system with a locating means provided to locate the observer's eyeball on the pupil position, it is then possible to construct an image display device of small size.

If the locating means is designed such that the optical system is mounted on an observer's head, it is then possible for the observer to view images in a free position or direction. In short, the observer can view images in a comfortable position. For instance, even a bedridden sick person can view images in a bedridden position if the image display device is worn on her or his head. It is thus possible to construct a head-mounted image display device of small size.

If an image recording means is located at the position of the image display element with a stop positioned at the position of an eyeball, it is then possible to provide an image pickup optical system of small size, and by the addition thereto of function capable of forming an image of an object at infinity, it is further possible to provide an image-forming optical system, e.g., a finder optical system used on such a camera as shown in FIGS. 19 and 20.

Furthermore, if the first and second reflecting surfaces are constructed of convex and concave mirrors, each concave surface directed to the pupil side, coma, field curvature, and other aberrations can then be more favorably corrected.

To make the optical system simpler in construction, it is more preferably constructed of one optical element, and used in combination with the diffraction optical element.

Of importance in this invention is that the following condition (4) be satisfied $$70° < \theta_1 < 160° \tag{4}$$

assuming that a light ray leaving the center of an object point and arriving at the center of the pupil defines a principal ray. Here $\theta_1$ represents an angle which the principal ray incident on the first reflecting surface makes with the principal ray emerging therefrom.

This condition is provided to determine the longitudinal size of the optical system. At an angle smaller than the lower-limit angle of 70°, the first transmitting surface and second reflecting surface of the optical system interfere with each other, so rendering it impossible to make sure of any wide viewing angle. At an angle exceeding the upper-limit angle of 160° it is difficult to make the optical system compact because its longitudinal size becomes large.

It is more preferable that the following condition (4)' be satisfied $$80° < \theta_1 < 140° \tag{4'}$$

Of importance in this invention is also that the following condition (5) be satisfied $$30° < \theta_2 < 120° \tag{5}$$

assuming that a principal ray is defined by a light ray leaving the center of an object point and arriving at the center of the pupil. Here $\theta_2$ represents an angle which the principal ray incident on the second reflecting surface makes with the principal ray emerging therefrom.

This condition is provided to determine the longitudinal size of the optical system. At an angle smaller than the lower-limit angle of 30°, the first transmitting surface and second reflecting surface of the optical system interfere with each other, so rendering it impossible to make sure of any wide viewing angle. At an angle exceeding the upper-limit angle of 120° it is difficult to make the optical system compact because its longitudinal size becomes large.

It is more preferable that the following condition (5)' be satisfied $$35° < \theta_2 < 70° \tag{5'}$$

When the diffraction optical element is fabricated in a rotationally symmetric form, it is preferable that the diffraction optical element be decentered with respect to the principal ray. Preferably in this case, the quantity of decentering of the diffraction optical element conforms to $$-50 < d < 50 (mm) \tag{6}$$

$$-50 < \alpha < 50 (°) \tag{7}$$

where d is a decentering, and α is a tilt.

Deviations from the upper and lower limits in this condition cause the quantity of decentering of the diffraction optical element to become large, and so render it impossible to achieve any favorable aberration correction, because coma and astigmatism produced by the decentering of the optical system are ill balanced upon corrected at the optical system.

More preferably, $$-10 < d < 10 (mm) \tag{6'}$$

$$-10 < \alpha < 20 (°) \tag{7'}$$

This makes more favorable aberration correction possible.

Referring here to a principal ray passing through the center of the stop and arriving at the center of the image plane, and a light ray traveling in the vicinity of the principal ray and passing through the stop at a height h, the focal length of the overall optical system in the vicinity of the principal ray can be found by $$f = h/\sin(\tan^{-1} u_1 - \tan^{-1} u_2)$$

where $u_1$ is an angle at which the principal ray intersects the image plane, and $u_2$ is an angle at which the light ray intersects the image plane upon traveling in the vicinity of the principal ray and passing through the stop at the height h.

Here let F be given by (Focal length f of the overall optical system)/(Focal length f of the diffraction optical element)

Then, it is preferable that the following condition (8) be satisfied $$-2 < F < 2 \tag{8}$$

This, too, is the condition set down for determining a balance between the corrections of aberrations by the overall optical system and the diffraction optical element. Deviations from the upper and lower limits in this condition cause the amount of aberrations corrected by the diffraction optical element to become large, and so render it impossible to achieve any favorable aberration correction, because field curvature and chromatic aberration produced at the optical system are ill balanced upon corrected by the diffraction optical element.

More preferably, $$-1 < F < 1 \tag{8'}$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Several numerical examples of the invented optical system used on an image display device will now be explained with reference to the drawings.

In these examples, rays were back traced from the pupil position to the image display element, and the object position was found at a virtual image position spaced -1 m away from the pupil.

Figure 1:
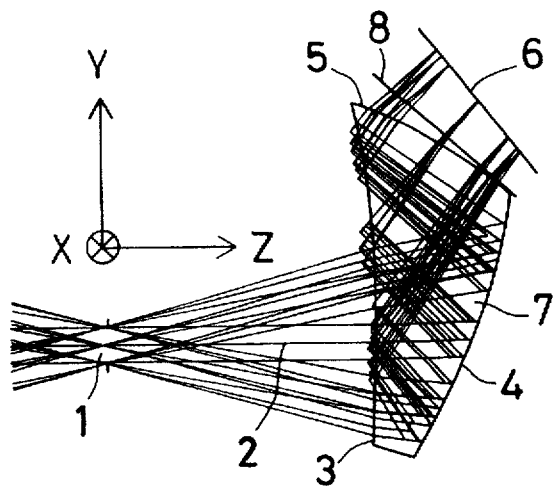
FIG. 1 is a sectional schematic of a monocular image display device making use of an optical system of Example 1 according to the present invention.
Figure 2:
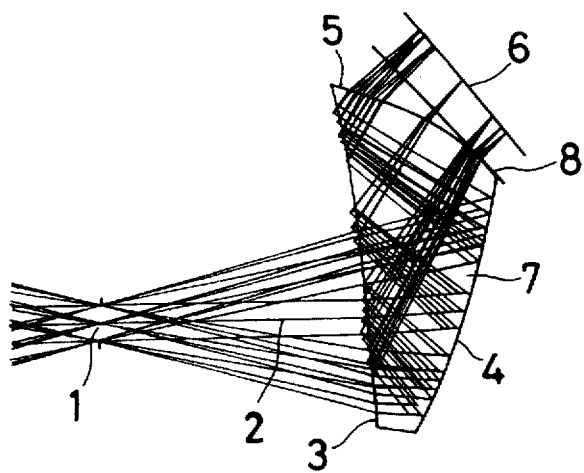
FIG. 2 is a sectional schematic of a monocular image display device making use of an optical system of Example 2 of the present invention.
Figure 3:
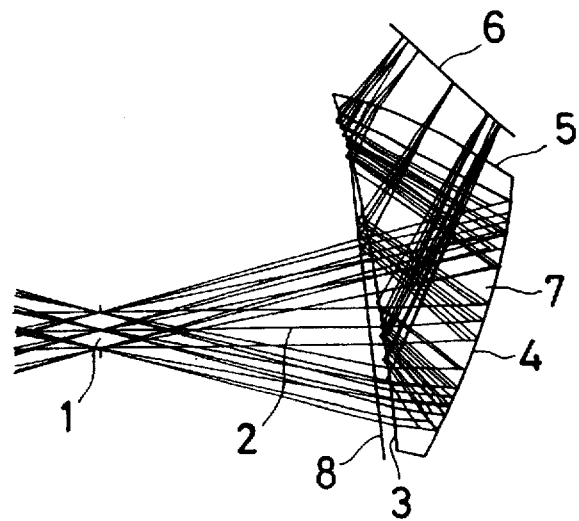
FIG. 3 is a sectional schematic of a monocular image display device making use of an optical system of Example 3 according to the present invention.
Figure 4:
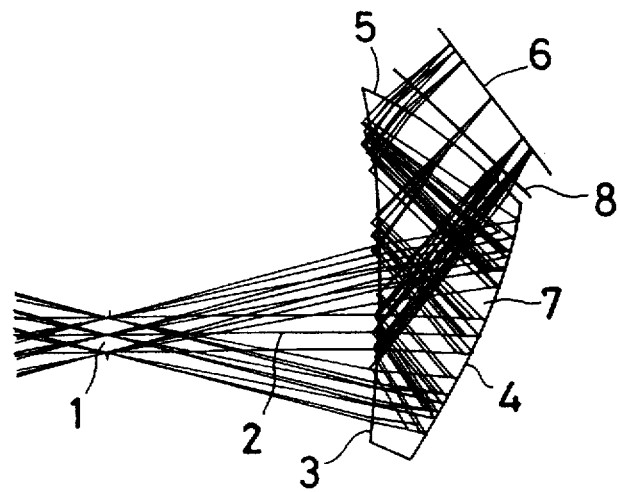
FIG. 4 is a sectional schematic of a monocular image display device making use of an optical system of Example 4 of the present invention.
Figure 5:
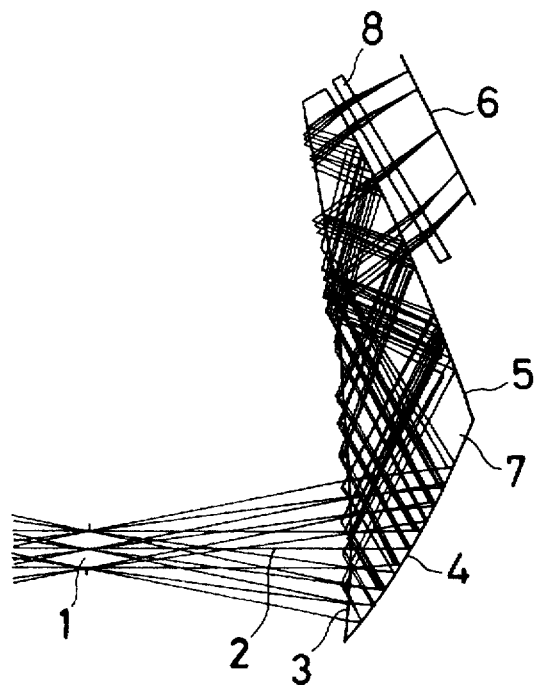
FIG. 5 is a sectional schematic of a monocular image display device making use of an optical system of Example 5 of the present invention.
Figure 6:
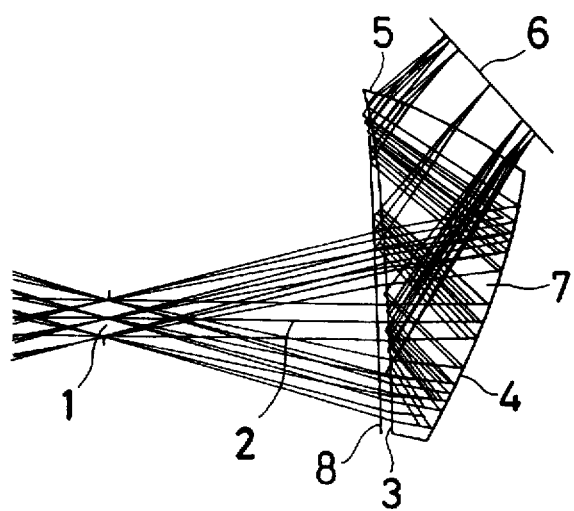
FIG. 6 is a sectional schematic of a monocular image display device making use of an optical system of Example 6 according to the present invention.
Figure 7:
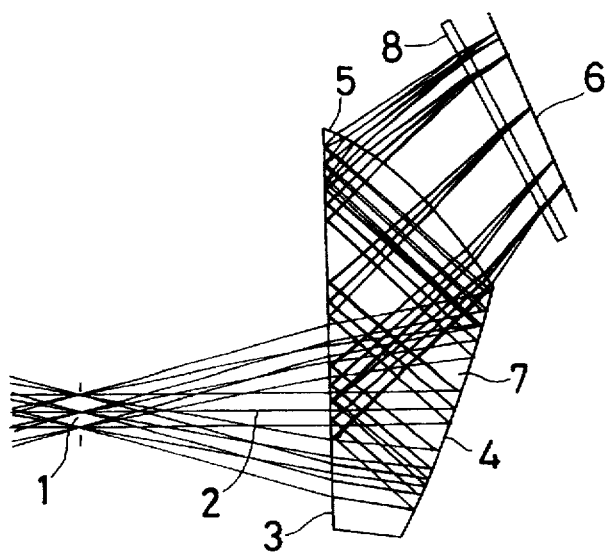
FIG. 7 is a sectional schematic of a monocular image display device making use of an optical system of Example 7 of the present invention.

Constitutional parameters of Examples 1 through 7 will be given later. In what follows, surface Nos. are given by back-tracing surface Nos. as counted from an exit pupil position (observer's pupil position) 1 toward a display surface of an image display element 6. As shown in FIG. 1, a coordinate system is composed of the origin defined by a center of the exit pupil 1 of the optical system, and a Z axis defined by an observer's visual axis 2. It is here to be noted that the Z axis is assumed to have a plus sign in a direction that goes away from the center of the pupil 1. Within the sheet plane of FIG. 1 a Y axis is perpendicular to the Z axis on condition that its upward direction has a plus sign, and that an X axis is perpendicular to the Z and Y axes, viz., vertical to the sheet plane of FIG. 1. Here let the direction of the X axis have a positive sign in a direction of the sheet plane from the front to the back side.

Of the constitutional parameters to be described later, Y, Z and θ represent amounts of decentration of a vertex of a given surface from the reference one surface (pupil position 1) in the Y and Z axis directions and an angle of inclination of a center axis of that given surface from the Z axis, respectively. It is here to be noted that the plus sign attached to θ means the direction of counterclockwise rotation. Since three surfaces extending from the surface of a diffraction optical element substrate to the diffracting surface are coaxial, reference is only made to amounts of decentration of a vertex of a given surface (pupil position 1) of the diffraction optical element substrate in the Y and Z axis direction and an angle of inclination of a center axis of that given surface from the Z axis, respectively. Layouts of the other surfaces are denoted in terms of surface separation.

For details of a diffraction optical element see, for instance, "Small Optical Elements for Optical System Designers", Chapters 6 and 7 (Optoronics Co., Ltd.), and "SPIE", Vol. 126, pp. 46–53 (1977). The diffraction optical element may be dealt as being equivalent to any arbitrary aspheric lens surface, because the diffraction grating interstices can freely be varied. The "Ultra-high index method" described in "SPIE", Vol. 126, pp. 46–53 (1977) is incorporated herein by reference.

For each surface, irrotationally symmetric aspheric shape is given by $$Z=[(X^2/Rx)+(Y^2/Ry)]/[1+\{1-(1+Kx)(X^2/Rx^2)-(1+Ky)(Y^2/Ry^2)\}^{1/2}]+AR[(1-AP)X^2+(1+AP)Y^2]^2+BR[(1-BP)X^2+(1+BP)Y^2]^3+CR[(1-CP)X^2+(1+CP)Y^2]^4+DR[(1-DP)X^2+(1+DP)Y^2]^5$$

where, on the coordinates defining that surface, Ry and Rx are the paraxial radii of curvature of the aspheric surface within the Y-Z plane (sheet plane) and the X-Z plane, respectively, Kx and Ky are the conical coefficients of the aspheric surface within the X-Z plane and the Y-Z plane, respectively, AR, BR, CR and DR are the fourth-, sixth-, eighth- and tenth-order aspheric coefficients of the aspheric surface rotationally symmetric with respect to the Z axis, respectively, and AP, BP, CP and DP are the fourth-, sixth-, eighth- and tenth-order aspheric coefficients of the aspheric surface irrotationally symmetric with respect to the Z axis, respectively.

For each surface, rotationally symmetric aspheric surface shape is given by $$Z=(h^2/R)/[1+\{1-(1+K)(h^2/R^2)\}^{1/2}]+Ah^4+Bh^6+Ch^8+Dh^{10}$$

where, on the coordinates defining that surface, R is the paraxial radius of curvature of the aspheric surface, K is the conical coefficient of the aspheric surface, A, B, C and D are the fourth-, sixth-, eighth- and tenth-order asherical coefficients of the aspheric surface, and $h^2=X^2+Y^2$.

It is here to be understood that the coordinate system for each of the above formulae representing the surface shapes is one where the original is defined by the vertex of each surface, and the Z axis is defined by the center axis of each surface.

Of the constitutional parameters given later, parameters with no values attached to them are taken as being zero. The refractive index of a medium between adjacent surfaces is given in terms of a d-line (587.56 nm wavelength) refractive index. Length unit is given in terms of millimeters.

When the optical system is used on an actual device, it is understood that light may be reflected by the optical system in either an upward direction or a transverse direction, as viewed from the observer.

Needless to say, the optical system of the present invention may be used as an image-forming optical system for forming an image of an object at a distant point.

FIGS. 1 to 7 are sectional schematics of Examples 1 to 7 of the monocular image display device constructed according to the present invention.

In the respective figures, reference numeral 1 represents a pupil position of an observer (an exit pupil position); 2 a visual axis of the observer; 3, 4, and 5 first, second, and third surfaces of an optical element; 6 an image display element; 7 the optical element; and 8 a diffraction optical element.

Referring to an actual optical path in Examples 1, 2, 4, and 7, a pencil of light emanating from the image display element 6 passes through the diffraction optical element 8, and is incident on the optical system 7, and upon refraction at the third surface 5 thereof, is internally reflected at the first surface 3, and at the second surface 4, and again incident on the first surface 3 where it is refracted, so that it is projected into the eyeball of the observer with the iris position of the observer's pupil or the center of rotation of the eyeball acting as the exit pupil 1. In these examples, the first transmitting surface is defined by the third surface 5, the first reflecting surface by the first surface 3, the second reflecting surface by the second surface 4, and the second transmitting surface by the first surface 3, while the first reflecting surface and the second transmitting surface are of the same shape and positioned at the same location.

Referring to an actual optical path in Examples 3, and 6, a pencil of light emanating from the image display element 6 is incident on the optical system 7 upon refracted at the third surface 5 thereof, internally reflected at the first surface 3, reflected at the second surface 4, again incident on the first surface 3 where it is refracted, and emerges from the optical element 7, so that it is projected via the diffraction optical element 8 into the eyeball of the observer with the iris position of the observer's pupil or the center of rotation of the eyeball acting as the exit pupil 1. In these examples, the first transmitting surface is defined by the third surface 5, the first reflecting surface by the first surface 3, the second reflecting surface by the second surface 4, and the second transmitting surface by the first surface 3, while the first reflecting surface and the second transmitting surface are of the same shape and positioned at the same location.

Referring to an actual optical path in Example 5, a pencil of light emanating from the image display element 6 passes through the diffraction optical element 8, and is incident on the optical system 7 upon refracted at the third surface 5 thereof, internally reflected at the first surface 3, again incident on the third surface 5 at which it is internally reflected, reflected at the second surface 4, and once again incident on the first surface 3 at which it is refracted, so that it is projected into the eyeball of the observer with the iris position of the observer's pupil or the center of rotation of the eyeball acting as the exit pupil 1. In this example, the first transmitting surface is defined by the third surface 5, the first reflecting surface by the first surface 3, the second reflecting surface by the third surface 5, the third reflecting surface by the first surface 3, the fourth reflecting surface by the second surface 4, and the second transmitting surface by the first surface 3, while the first transmitting surface and the second reflecting surface are of the same shape and positioned at the same location, and the first reflecting surface, the third reflecting surface and the second transmitting surface are of the same shape and positioned at the same location.

Set out below are the angle of field, and pupil diameter of each example.

Example 1 is 40 degrees in the horizontal angle of field, 30 degrees in the vertical angle of field, and 4 millimeters in pupil diameter.

Example 2 is 40 degrees in the horizontal angle of field, 30 degrees in the vertical angle of field, and 4 millimeters in pupil diameter.

Example 3 is 40 degrees in the horizontal angle of field, 30 degrees in the vertical angle of field, and 4 millimeters in pupil diameter.

Example 4 is 40 degrees in the horizontal angle of field, 30 degrees in the vertical angle of field, and 4 millimeters in pupil diameter.

Example 5 is 30 degrees in the horizontal angle of field, 22.5 degrees in the vertical angle of field, and 4 millimeters in pupil diameter.

Example 6 is 40 degrees in the horizontal angle of field, 30 degrees in the vertical angle of field, and 4 millimeters in pupil diameter.

Example 7 is 40 degrees in the horizontal angle of field, 30 degrees in the vertical angle of field, and 4 millimeters in pupil diameter.

Enumerated below are the values of the constitutional parameters of Examples 1 to 7.

EXAMPLE 1

| Surface No. | | Radius of curvature | Surface separation | Refractive index (Displacement) | Abbe's No. (Tilt angle) |
|---|---|---|---|---|---|
| 1 | | ∞(pupil) | | | |
| 2 | $R_y$ | −71.17939 | | 1.4922 | 57.50 |
| | $R_x$ | −64.5987 | | Y 43.462 | θ 21.63° |
| | $K_y$ | 0 | | Z 24.298 | |
| | $K_x$ | 0 | | | |
| | AR | $0.189094 \times 10^{-5}$ | | | |
| | BR | $0.502157 \times 10^{-15}$ | | | |
| | CR | $-0.279487 \times 10^{-13}$ | | | |
| | DR | $-0.109879 \times 10^{-15}$ | | | |
| | AP | −0.164076 | | | |
| | BP | 53.350587 | | | |
| | CP | 0.031156 | | | |
| | DP | −0.572366 | | | |
| 3 | $R_y$ | −77.512310 | | 1.4922 | 57.50 |
| | $R_x$ | −59.71490 | | Y 14.711 | θ −10.29° |
| | $K_y$ | 0 | | Z 46.484 | |
| | $K_x$ | 0 | | | |
| | AR | $-0.869330 \times 10^{-12}$ | | | |
| | BR | $0.233397 \times 10^{-10}$ | | | |
| | CR | $-0.939132 \times 10^{-13}$ | | | |
| | DR | $-0.269891 \times 10^{-15}$ | | | |
| | AP | −341.628501 | | | |
| | BP | 1.998719 | | | |
| | CP | 0.538375 | | | |
| | DP | −0.017896 | | | |
| 4 | $R_y$ | −71.17939 | | 1.4922 | 57.50 |
| | $R_x$ | −64.5987 | | Y 43.462 | θ 21.63° |
| | $K_y$ | 0 | | Z 24.298 | |
| | $K_x$ | 0 | | | |
| | AR | $0.189094 \times 10^{-5}$ | | | |
| | BR | $0.502157 \times 10^{-15}$ | | | |
| | CR | $-0.279487 \times 10^{-13}$ | | | |
| | DR | $-0.109879 \times 10^{-15}$ | | | |
| | AP | −0.164076 | | | |
| | BP | 53.350587 | | | |
| | CP | 0.031156 | | | |
| | DP | −0.572366 | | | |
| 5 | $R_y$ | −52.225998 | | Y 29.105 | θ 78.19° |

-continued

| Surface No. | | Radius of curvature | Surface separation | Refractive index (Displacement) | Abbe's No. (Tilt angle) |
|---|---|---|---|---|---|
| | $R_x$ | −39.65538 | | Z 21.624 | |
| | $K_y$ | 0 | | | |
| | $K_x$ | 0 | | | |
| | AR | $0.290484 \times 10^{-4}$ | | | |
| | BR | $-0.875623 \times 10^{-7}$ | | | |
| | CR | $0.144496 \times 10^{-9}$ | | | |
| | DR | $-0.779302 \times 10^{-13}$ | | | |
| | AP | −0.787876 | | | |
| | BP | −0.424320 | | | |
| | CP | −0.261606 | | | |
| | DP | −0.191974 | | | |
| 6 | | ∞ | 0.250 | 1.5163 | 64.10 |
| (base surface of diffraction grating) | | | | Y 23.095 | θ 49.79° |
| | | | | Z 39.274 | |
| 7 | | ∞ | 0.000 | 1001 | −3.45 |
| 8 | | −244948.903275 | (diffraction surface) | | |
| | K | 0 | | | |
| | A | $-0.590641 \times 10^{-8}$ | | | |
| | B | $0.524567 \times 10^{-10}$ | | | |
| | C | $0.914818 \times 10^{-13}$ | | | |
| | D | $-0.907250 \times 10^{-15}$ | | | |
| 9 | | ∞(image display plane) | | Y 27.171 | θ 39.16° |
| | | | | Z 43.254 | |

EXAMPLE 2

| Surface No. | | Radius of curvature | Surface separation | Refractive index (Displacement) | Abbe's No. (Tilt angle) |
|---|---|---|---|---|---|
| 1 | | ∞(pupil) | | | |
| 2 | $R_y$ | −79.38031 | | 1.4922 | 57.50 |
| | $R_x$ | −80.18493 | | Y 41.448 | θ 21.53° |
| | $K_y$ | 0 | | Z 23.485 | |
| | $K_x$ | 0 | | | |
| | AR | $0.146956 \times 10^{-5}$ | | | |
| | BR | $0.549579 \times 10^{-15}$ | | | |
| | CR | $-0.258466 \times 10^{-13}$ | | | |
| | DR | $-0.732260 \times 10^{-15}$ | | | |
| | AP | −0.147439 | | | |
| | BP | 55.826649 | | | |
| | CP | 0.012500 | | | |
| | DP | −0.775575 | | | |
| 3 | $R_y$ | −80.70890 | | 1.4922 | 57.50 |
| | $R_x$ | −61.92076 | | Y 10.566 | θ −12.08° |
| | $K_y$ | 0 | | Z 45.313 | |
| | $K_x$ | 0 | | | |
| | AR | $0.37995 \times 10^{-11}$ | | | |
| | BR | $0.587113 \times 10^{-10}$ | | | |
| | CR | $-0.577526 \times 10^{-13}$ | | | |
| | DR | $-0.107906 \times 10^{-14}$ | | | |
| | AP | −151.584065 | | | |
| | BP | 1.826841 | | | |
| | CP | 0.952204 | | | |
| | DP | −0.242091 | | | |
| 4 | $R_y$ | −79.38031 | | 1.4922 | 57.50 |
| | $R_x$ | −80.18493 | | Y 41.448 | θ 21.53° |
| | $K_y$ | 0 | | Z 23.485 | |
| | $K_x$ | 0 | | | |
| | AR | $0.146956 \times 10^{-5}$ | | | |
| | BR | $0.549579 \times 10^{-15}$ | | | |
| | CR | $-0.258466 \times 10^{-13}$ | | | |
| | DR | $0.732260 \times 10^{-15}$ | | | |
| | AP | −0.147439 | | | |
| | BP | 55.826649 | | | |
| | CP | 0.012500 | | | |
| | DP | −0.775575 | | | |
| 5 | $R_y$ | −42.27641 | | Y 27.378 | θ 86.34° |
| | $R_x$ | −89.13397 | | Z 21.361 | |
| | $K_y$ | 0 | | | |
| | $K_x$ | 0 | | | |
| | AR | $0.362749 \times 10^{-7}$ | | | |

-continued

| Surface No. | | Radius of curvature | Surface separation | Refractive index (Displacement) | Abbe's No. (Tilt angle) |
|---|---|---|---|---|---|
| | BR | $-0.123433 \times 10^{-7}$ | | | |
| | CR | 0 | | | |
| | DR | 0 | | | |
| | AP | $-14.544698$ | | | |
| | BP | 0.088670 | | | |
| | CP | 0 | | | |
| | DP | 0 | | | |
| 6 | | ∞ | 0.250 | 1.5163 | 64.10 |
| (base surface of diffraction grating) | | | | Y 27.521 | θ 44.04° |
| | | | | Z 35.248 | |
| 7 | | ∞ | 0.000 | 1001 | $-3.45$ |
| 8 | | $-259967.754835$ | (diffraction surface) | | |
| | K | 0 | | | |
| | A | $0.295513 \times 10^{-7}$ | | | |
| | B | $-0.270162 \times 10^{-10}$ | | | |
| | C | $0.223860 \times 10^{-12}$ | | | |
| | D | $-0.328751 \times 10^{-15}$ | | | |
| 9 | | ∞(image display plane) | | Y 26.947 | θ 38.98° |
| | | | | Z 42.638 | |

EXAMPLE 3

| Surface No. | | Radius of curvature | Surface separation | Refractive index (Displacement) | Abbe's No. (Tilt angle) |
|---|---|---|---|---|---|
| 1 | | ∞(pupil) | | | |
| 2 | | ∞ | 0.280 | 1.5163 | 64.10 |
| (base surface of diffraction grating) | | | | Y 4.361 | θ 6.46° |
| | | | | Z 30.506 | |
| 3 | | ∞ | 0.000 | 1001 | $-3.45$ |
| 4 | | $-1210471.75072$ | (diffraction surface) | | |
| | K | 0 | | | |
| | A | $0.681966 \times 10^{-9}$ | | | |
| | B | $-0.294141 \times 10^{-11}$ | | | |
| | C | $0.635773 \times 10^{-14}$ | | | |
| | D | $-0.316842 \times 10^{-17}$ | | | |
| 5 | $R_y$ | $-91.85932$ | | 1.4922 | 57.50 |
| | $R_x$ | $-85.77710$ | | Y 42.786 | θ 25.01° |
| | $K_y$ | 0 | | Z 21.186 | |
| | $K_x$ | 0 | | | |
| | AR | $0.150944 \times 10^{-5}$ | | | |
| | BR | $0.581341 \times 10^{-15}$ | | | |
| | CR | $-0.309854 \times 10^{-13}$ | | | |
| | DR | $-0.622017 \times 10^{-15}$ | | | |
| | AP | $-0.238195$ | | | |
| | BP | 55.180495 | | | |
| | CP | 0.096230 | | | |
| | DP | $-0.784416$ | | | |
| 6 | $R_y$ | $-80.263766$ | | 1.4922 | 57.50 |
| | $R_x$ | $-65.58356$ | | Y 12.859 | θ $-8.05°$ |
| | $K_y$ | 0 | | Z 46.986 | |
| | $K_x$ | 0 | | | |
| | AR | $-0.320509 \times 10^{-8}$ | | | |
| | BR | $0.441212 \times 10^{-10}$ | | | |
| | CR | $-0.320183 \times 10^{-12}$ | | | |
| | DR | $-0.790570 \times 10^{-15}$ | | | |
| | AP | $-0.748250$ | | | |
| | BP | 1.67572 | | | |
| | CP | 0.472263 | | | |
| | DP | $-0.340182$ | | | |
| 7 | $R_y$ | $-91.85932$ | | 1.4922 | 57.50 |
| | $R_x$ | $-85.77710$ | | Y 42.786 | θ 25.01° |
| | $K_y$ | 0 | | Z 21.186 | |
| | $K_x$ | 0 | | | |
| | AR | $0.150944 \times 10^{-5}$ | | | |
| | BR | $0.581341 \times 10^{-15}$ | | | |
| | CR | $-0.309854 \times 10^{-13}$ | | | |
| | DR | $-0.622017 \times 10^{-15}$ | | | |
| | AP | $-0.238195$ | | | |
| | BP | 55.180495 | | | |
| | CP | 0.096230 | | | |

-continued

| Surface No. | | Radius of curvature | Surface separation | Refractive index (Displacement) | Abbe's No. (Tilt angle) |
|---|---|---|---|---|---|
| | DP | −0.784416 | | | |
| 8 | $R_y$ | −60.476554 | | Y 28.128 | θ 81.46° |
| | $R_x$ | −34.92352 | | Z 20.175 | |
| | $K_y$ | 0 | | | |
| | $K_x$ | 0 | | | |
| | AR | $0.445485 \times 10^{-4}$ | | | |
| | BR | $-0.169231 \times 10^{-6}$ | | | |
| | CR | $0.331085 \times 10^{-9}$ | | | |
| | DR | $-0.217700 \times 10^{-12}$ | | | |
| | AP | −0.785547 | | | |
| | BP | −0.518386 | | | |
| | CP | −0.402954 | | | |
| | DP | −0.355235 | | | |
| 9 | | ∞(image display plane) | | Y 27.946 | θ 47.35° |
| | | | | Z 40.648 | |

EXAMPLE 4

| Surface No. | | Radius of curvature | Surface separation | Refractive index (Displacement) | Abbe's No. (Tilt angle) |
|---|---|---|---|---|---|
| 1 | | ∞(pupil) | | | |
| 2 | $R_y$ | −63.687638 | | 1.4922 | 57.50 |
| | $R_x$ | −52.93087 | | Y 42.650 | θ 21.79° |
| | $K_y$ | 0 | | Z 25.411 | |
| | $K_x$ | 0 | | | |
| | AR | $0.237756 \times 10^{-5}$ | | | |
| | BR | $0.497821 \times 10^{-15}$ | | | |
| | CR | $-0.279870 \times 10^{-13}$ | | | |
| | DR | $-0.880162 \times 10^{-15}$ | | | |
| | AP | −0.194847 | | | |
| | BP | 54.229862 | | | |
| | CP | −0.082177 | | | |
| | DP | −0.563852 | | | |
| 3 | $R_y$ | −74.468047 | | 1.4922 | 57.50 |
| | $R_x$ | −56.85709 | | Y 12.514 | θ −12.67° |
| | $K_y$ | 0 | | Z 46.582 | |
| | $K_x$ | 0 | | | |
| | AR | $-0.175162 \times 10^{-12}$ | | | |
| | BR | $0.101402 \times 10^{-10}$ | | | |
| | CR | $-0.133271 \times 10^{-12}$ | | | |
| | DR | $-0.313264 \times 10^{-15}$ | | | |
| | AP | −102.638843 | | | |
| | BP | 2.769603 | | | |
| | CP | 0.488057 | | | |
| | DP | −0.048522 | | | |
| 4 | $R_y$ | −63.687638 | | 1.4922 | 57.50 |
| | $R_x$ | −52.93087 | | Y 42.650 | θ 21.79° |
| | $K_y$ | 0 | | Z 25.411 | |
| | $K_x$ | 0 | | | |
| | AR | $0.237756 \times 10^{-5}$ | | | |
| | BR | $0.497821 \times 10^{-15}$ | | | |
| | CR | $-0.279870 \times 10^{-13}$ | | | |
| | DR | $-0.880162 \times 10^{-16}$ | | | |
| | AP | −0.194847 | | | |
| | BP | 54.229862 | | | |
| | CP | −0.082177 | | | |
| | DP | −0.563852 | | | |
| 5 | $R_y$ | −32.35945 | | Y 28.650 | θ 71.97° |
| | $R_x$ | −28.57891 | | Z 28.100 | |
| | $K_y$ | 0 | | | |
| | $K_x$ | 0 | | | |
| | AR | $0.180717 \times 10^{-4}$ | | | |
| | BR | $-0.215221 \times 10^{-7}$ | | | |
| | CR | $0.107474 \times 10^{-9}$ | | | |
| | DR | $-0.117215 \times 10^{-12}$ | | | |
| | AP | −1.132480 | | | |
| | BP | −0.971905 | | | |
| | CP | 0.000688 | | | |
| | DP | 0.051621 | | | |
| 6 | | ∞ | 0.250 | 1.5163 | 64.10 |

-continued

| Surface No. | | Radius of curvature | Surface separation | Refractive index (Displacement) | Abbe's No. (Tilt angle) |
|---|---|---|---|---|---|
| (base surface of diffraction grating) | | | | Y 23.040 | θ 47.79° |
| | | | | Z 40.285 | |
| 7 | | ∞ | 0.000 | 1001 | −3.45 |
| 8 | | −464779 | (diffraction surface) | | |
| | K | 0 | | | |
| | A | −0.796488 × 10⁻⁸ | | | |
| | B | 0.233311 × 10⁻¹⁰ | | | |
| 9 | | ∞(image display plane) | | Y 27.154 | θ 37.36° |
| | | | | Z 43.842 | |

EXAMPLE 5

| Surface No. | | Radius of curvature | Surface separation | Refractive index (Displacement) | Abbe's No. (Tilt angle) |
|---|---|---|---|---|---|
| 1 | | ∞ (pupil) | | | |
| 2 | $R_y$ | −292.331787 | | 1.5163 | 64.10 |
| | $R_x$ | −64.47050 | | Y 33.943 | θ 7.70° |
| | $K_y$ | 0 | | Z 27.360 | |
| | $K_x$ | 0 | | | |
| | AR | 0.401020 × 10⁻⁶ | | | |
| | AP | −0.693944 | | | |
| 3 | $R_y$ | −1501.496515 | | 1.5163 | 64.10 |
| | $R_x$ | −102.59918 | | Y 94.211 | θ −10.16° |
| | $K_y$ | 0 | | Z 64.769 | |
| | $K_x$ | 0 | | | |
| | AR | −0.870453 × 10⁻⁷ | | | |
| | AP | −0.042140 | | | |
| 4 | $R_y$ | −292.331787 | | 1.5163 | 64.10 |
| | $R_x$ | −64.47050 | | Y 33.943 | θ 7.70° |
| | $K_y$ | 0 | | Z 27.360 | |
| | $K_x$ | 0 | | | |
| | AR | 0.401020 × 10⁻⁶ | | | |
| | AP | −0.693944 | | | |
| 5 | $R_x$ | −119.796883 | | 1.5163 | 64.10 |
| | $R_y$ | −49.36833 | | Y 63.187 | θ 38.77° |
| | $K_y$ | 0 | | Z 19.430 | |
| | $K_x$ | 0 | | | |
| | AR | 0.946153 × 10⁻⁶ | | | |
| | AP | −0.548848 | | | |
| 6 | $R_y$ | −292.331787 | | 1.5163 | 64.10 |
| | $R_x$ | −64.47050 | | Y 33.943 | θ 7.70° |
| | $K_y$ | 0 | | Z 27.360 | |
| | $K_x$ | 0 | | | |
| | AR | 0.401020 × 10⁻⁶ | | | |
| | AP | −0.693944 | | | |
| 7 | $R_y$ | −119.796883 | | | |
| | $R_x$ | −49.36833 | | Y 63.187 | θ 38.77° |
| | $K_y$ | 0 | | Z 19.430 | |
| | $K_x$ | 0 | | | |
| | AR | 0.946153 × 10⁻⁶ | | | |
| | AP | −0.548848 | | | |
| 8 | | ∞ | 1.000 | 1.5163 | 64.10 |
| (base surface of diffraction grating) | | | | Y 40.627 | θ 30.59° |
| | | | | Z 35.332 | |
| 9 | | ∞ | 0.000 | 1001 | −3.45 |
| 10 | | −43047.588167 | (diffraction surface) | | |
| | K | 0 | | | |
| | A | 0.436299 × 10⁻⁸ | | | |
| 11 | | ∞(image display plane) | | Y 47.9 | θ 27.12° |
| | | | | Z 40 | |

EXAMPLE 6

| Surface No. | | Radius of curvature | Surface separation | Refractive index (Displacement) | Abbe's No. (Tilt angle) |
|---|---|---|---|---|---|
| 1 | | ∞(pupil) | | | |
| 2 | | ∞ | 0.300 | 1.5163 | 64.10 |
| (base surface of diffraction grating) | | | | Y 0.528 | θ 3.52° |
| | | | | Z 30.968 | |
| 3 | | ∞ | 0.000 | 1001 | −3.45 |
| 4 | | −1014751.75463 | (diffraction surface) | | |
| | K | 0 | | | |
| | A | $0.787268 \times 10^{-9}$ | | | |
| | B | $0.182929 \times 10^{-11}$ | | | |
| | C | $-0.131126 \times 10^{-13}$ | | | |
| | D | $0.130609 \times 10^{-16}$ | | | |
| 5 | $R_y$ | −73.944129 | | 1.4922 | 57.50 |
| | $R_x$ | −69.91809 | | Y 46.027 | θ 24.71° |
| | $K_y$ | 0 | | Z 22.895 | |
| | $K_x$ | 0 | | | |
| | AR | $0.173092 \times 10^{-5}$ | | | |
| | BR | $0.394778 \times 10^{-15}$ | | | |
| | CR | $-0.310330 \times 10^{-13}$ | | | |
| | DR | $-0.421275 \times 10^{-16}$ | | | |
| | AP | −0.180837 | | | |
| | BP | 56.720372 | | | |
| | CP | −0.033823 | | | |
| | DP | −0.622396 | | | |
| 6 | $R_y$ | −80.26792 | | 1.4922 | 57.50 |
| | $R_x$ | −62.52811 | | Y 17.982 | θ −6.91° |
| | $K_y$ | 0 | | Z 47.566 | |
| | $K_x$ | 0 | | | |
| | AR | $-0.406113 \times 10^{-12}$ | | | |
| | BR | $0.137027 \times 10^{-10}$ | | | |
| | CR | $-0.478711 \times 10^{-13}$ | | | |
| | DR | $-0.107178 \times 10^{-15}$ | | | |
| | AP | −640.994824 | | | |
| | BP | 2.330409 | | | |
| | CP | 0.475262 | | | |
| | DP | 0.169588 | | | |
| 7 | $R_y$ | −73.944129 | | 1.4922 | 57.50 |
| | $R_x$ | −69.91809 | | Y 46.027 | θ 24.71° |
| | $K_y$ | 0 | | Z 22.895 | |
| | $K_x$ | 0 | | | |
| | AR | $0.173092 \times 10^{-5}$ | | | |
| | BR | $0.394778 \times 10^{-15}$ | | | |
| | CR | $-0.310330 \times 10^{-13}$ | | | |
| | DR | $-0.421275 \times 10^{-16}$ | | | |
| | AP | −0.180837 | | | |
| | BP | 56.720372 | | | |
| | CP | −0.033823 | | | |
| | DP | −0.622396 | | | |
| 8 | $R_y$ | −53.640971 | | Y 28.627 | θ 83.27° |
| | $R_x$ | −36.56938 | | Z 20.211 | |
| | $K_y$ | 0 | | | |
| | $K_x$ | 0 | | | |
| | AR | $0.313093 \times 10^{-4}$ | | | |
| | BR | $-0.981865 \times 10^{-7}$ | | | |
| | CR | $0.153577 \times 10^{-9}$ | | | |
| | DR | $-0.710929 \times 10^{-13}$ | | | |
| | AP | −0.887541 | | | |
| | BP | −0.531847 | | | |
| | CP | −0.347911 | | | |
| | DP | −0.245694 | | | |
| 9 | | ∞(image display plane) | | Y 27.588 | θ 43.23° |
| | | | | Z 43.381 | |

EXAMPLE 7

| Surface No. | Radius of curvature | Surface separation | Refractive index (Displacement) | Abbe's No. (Tilt angle) |
|---|---|---|---|---|
| 1 | ∞(pupil) | | | |
| 2 | ∞ | | 1.4922 | 57.50 |

-continued

| Surface No. | | Radius of curvature | Surface separation | Refractive index (Displacement) | Abbe's No. (Tilt angle) |
|---|---|---|---|---|---|
| | | | | Y 0 | θ 1.79° |
| | | | | Z 31 | |
| 3 | $R_y$ | −141.407945 | | 1.4922 | 57.50 |
| | $R_x$ | −126.83786 | | Y −5.513 | θ −22.10° |
| | $K_y$ | 0 | | Z 43.891 | |
| | $K_x$ | 0 | | | |
| | AR | $0.514241 \times 10^{-6}$ | | | |
| | BR | $0.691483 \times 10^{-10}$ | | | |
| | CR | $0.237472 \times 10^{-12}$ | | | |
| | DR | $-0.978814 \times 10^{-16}$ | | | |
| | AP | −0.079009 | | | |
| | BP | 0.169964 | | | |
| | CP | −0.300765 | | | |
| | DP | −0.242091 | | | |
| 4 | | ∞ | | 1.4922 | 57.50 |
| | | | | Y 0 | θ 1.79° |
| | | | | Z 31 | |
| 5 | | −41.519166 | | Y 23.703 | θ 44.32° |
| | | | | Z 43.596 | |
| 6 | | ∞ | 1.000 | 1.5163 | 64.10 |
| (base surface of diffraction grating) | | | | Y 32.575 | θ 28.99° |
| | | | | Z 51.228 | |
| 7 | | ∞ | 0.000 | 1001 | −3.45 |
| 8 | | 91082.1383941 | (diffraction surface) | | |
| | K | 0 | | | |
| | A | $-0.201624 \times 10^{-6}$ | | | |
| | B | $0.177572 \times 10^{-8}$ | | | |
| | C | $-0.722700 \times 10^{-11}$ | | | |
| | D | $0.108209 \times 10^{-13}$ | | | |
| 9 | | ∞(image display plane) | | Y 50.265 | θ 24.87° |
| | | | | Z 47.812 | |

Figure 8:
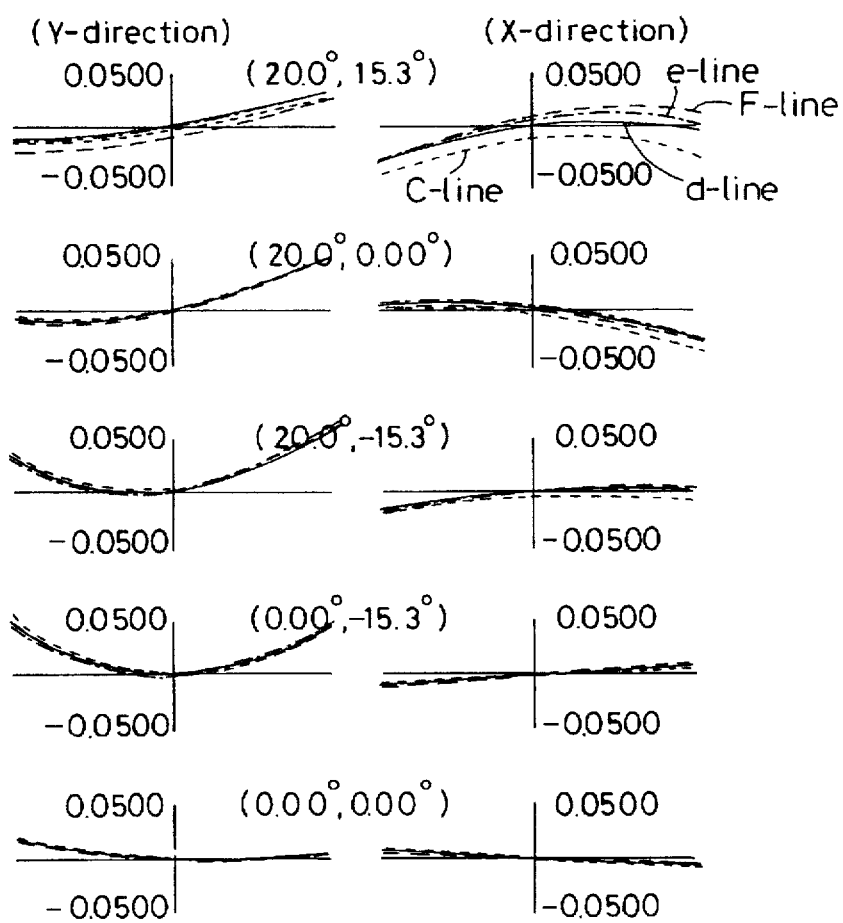
FIG. 8 is a part of a transverse aberration diagram of Example 1 of the present invention.
Figure 9:
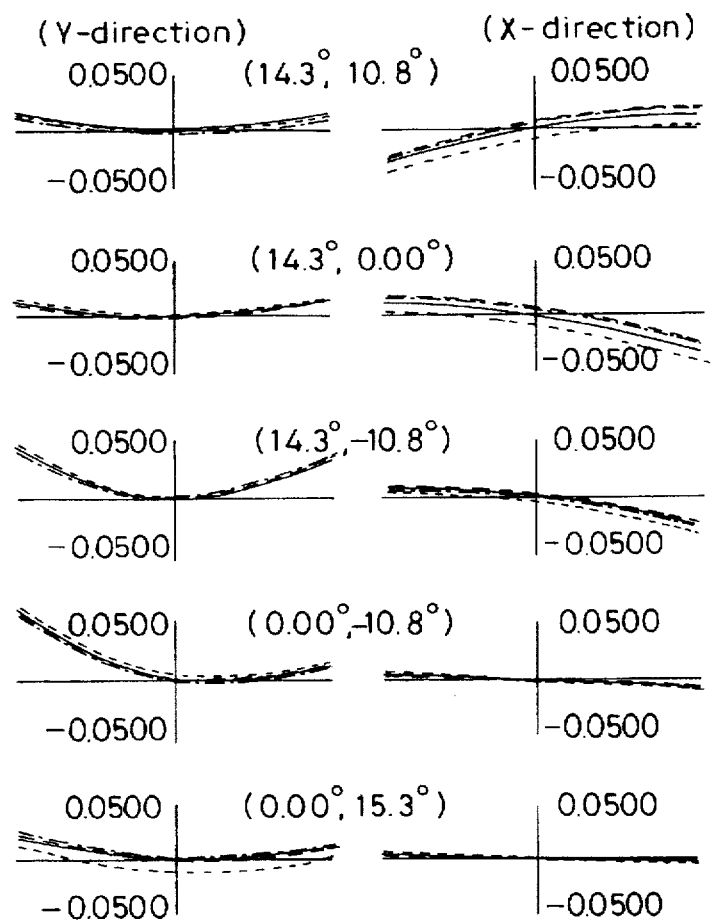
FIG. 9 is another part of the transverse aberration diagram of Example 1 of the present invention.
Figure 10:
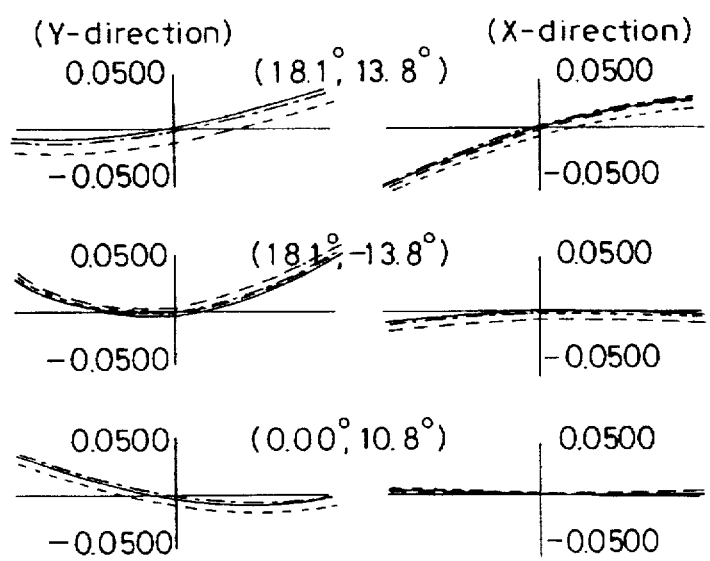
FIG. 10 is yet another part of the transverse aberration diagram of Example 1 of the present invention.

FIGS. 8 to 10 are transverse aberration diagrams of Example 1 of the foregoing seven examples. In these transverse aberration diagrams, the bracketed numerals represent the horizontal, and vertical angles of field, and stand for transverse aberrations at those angles.

Tabulated below are the overall focal lengths f of the optical systems according to Examples 1 to 7, and the focal lengths of the diffraction optical elements used therein as well as the values of $\theta_1$ given by condition (4), $\theta_2$ given by condition (5), d given by condition (6), α given by condition (7), and F given by condition (8).

| Ex. | f of the overall optical system | f of the diffraction optical element | $\theta_1$ (°) | $\theta_2$ (°) |
|---|---|---|---|---|
| 1 | 27.715 mm | 244.948 mm | 95.047 | 44.658 |
| 2 | 27.715 mm | 259.967 mm | 93.263 | 42.891 |
| 3 | 27.286 mm | 1210.471 mm | 96.631 | 40.897 |
| 4 | 28.775 mm | 464.779 mm | 94.909 | 45.589 |
| 5 | 36.201 mm | 43.047 mm | 128.768 | 60.972 |
| 6 | 27.778 mm | 1014.751 mm | 96.191 | 43.475 |
| 7 | 38.531 mm | −91.082 mm | 83.442 | 40.511 |

| Ex. | d (mm) | α (°) | F |
|---|---|---|---|
| 1 | −0.248 | −1.69 | 0.11315 |
| 2 | −5.867 | 3.89 | 0.10661 |
| 3 | −4.410 | −6.26 | 0.02254 |
| 4 | 0.026 | 1.07 | 0.06191 |
| 5 | 2.933 | 8.07 | 0.84096 |
| 6 | −0.542 | −3.49 | 0.02737 |
| 7 | −0.037 | 13.23 | −0.42304 |

In the aforesaid examples the anamorphic surfaces are used; however, it should be understood that use may be made of any desired surfaces inclusive of toric surfaces, rotationally symmetric surfaces, spherical surfaces, or free curved surfaces represented by the following equation:

$$Z = \sum_{n=0}^{k} \sum_{m=0}^{k'} C_{nm} x^m y^{n-m}$$

where x, y and z represent orthogonal coordinates, $C_{nm}$ is an arbitrary constant, and k and k' are arbitrary constants.

For conditions for surfaces such as curvature, and power, it is possible to determine their curvature and power by finding the curvature of a certain region obtained by differentiation of the shape of a surface portion coming in contact with an axial light ray propagating on the visual axis and arriving at the image display element along that axial light ray.

If two sets of optical systems according to each example are arranged, it is then possible to project an image on both eyes of an observer.

Figure 11:
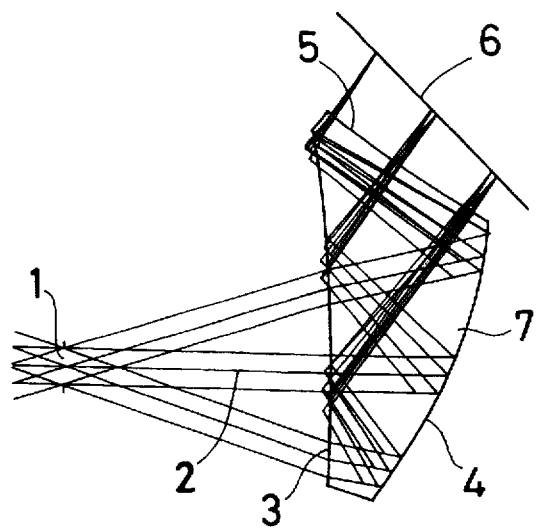
FIG. 11 is a sectional schematic of one embodiment of an optical element to which the present invention is applicable.
Figure 12:
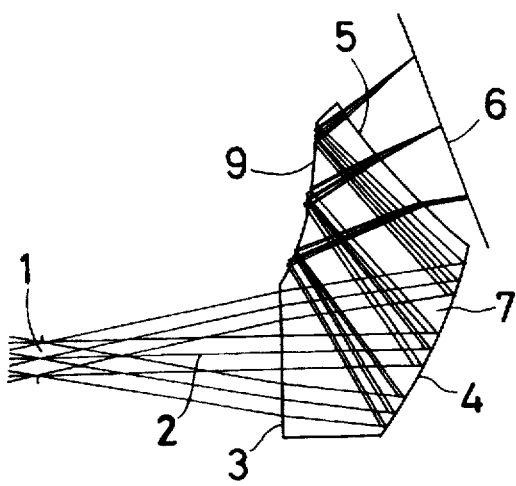
FIG. 12 is a sectional schematic of another embodiment of the optical element to which the present invention is applicable.

Throughout Examples 1–4, 6, and 7, the optical element 7 shown in FIG. 11 is basically used; however, it is understood that such optical elements 7 as shown in FIGS. 12 to 17 may be used in combination with the diffraction optical element. In the case of FIG. 12, the optical element 7 consists of the first surface 3, second surface 4, third surface 5, and fourth surface 9, and a pencil of light emanating from the image display element 6 is incident on the optical element 7 upon refracted at the third surface 5, internally reflected at the fourth surface 9, incident on the second surface 4 for internal reflection, and incident on the first surface 3 for refraction, so that it is projected into the eyeball of the observer with the iris position of the observer's pupil or the center of rotation of the eyeball acting as the exit pupil 1.

Figure 13:
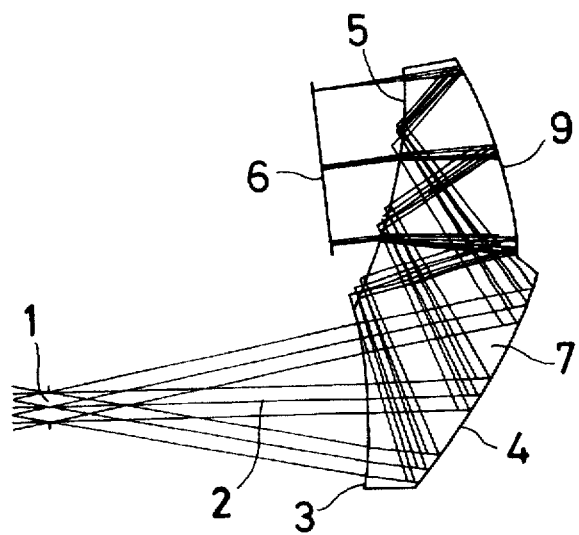
FIG. 13 is a sectional schematic of yet another embodiment of an optical element to which the present invention is applicable.

In the case of FIG. 13, the optical element 7 consists of the first surface 3, second surface 4, third surface 5, and fourth surface 9, and a pencil of light emanating from the image display element 6 is incident on the optical element 7 upon refracted at the third surface 5, internally reflected at the fourth surface 9, incident on the third surface 5 at which it is internally reflected, incident on the second surface 4 for internal reflection, and incident on the first surface 3 for refraction, so that it is projected into the eyeball of the observer with the iris position of the observer's pupil or the center of rotation of the eyeball acting as the exit pupil 1.

Figure 14:
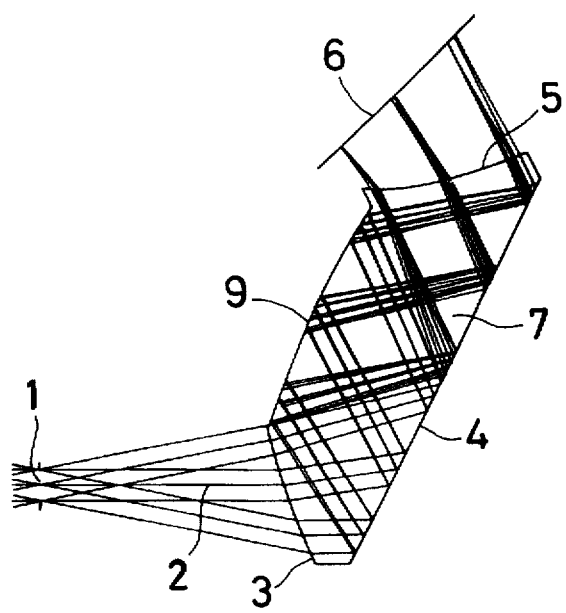
FIG. 14 is a sectional schematic of still yet another embodiment of the optical element to which the present invention is applicable.

In the case of FIG. 14, the optical element 7 consists of the first surface 3, second surface 4, third surface 5, and fourth surface 9, and a pencil of light emanating from the image display element 6 is incident on the optical element 7 upon refracted at the third surface 5, internally reflected at the second surface 4, incident on the fourth surface 9 at which it is internally reflected, internally reflected at the fourth surface 9, again incident on the second surface 4 for internal reflection, and incident on the first surface 3 for refraction, so that it is projected into the eyeball of the observer with the iris position of the observer's pupil or the center of rotation of the eyeball acting as the exit pupil 1.

Figure 15:
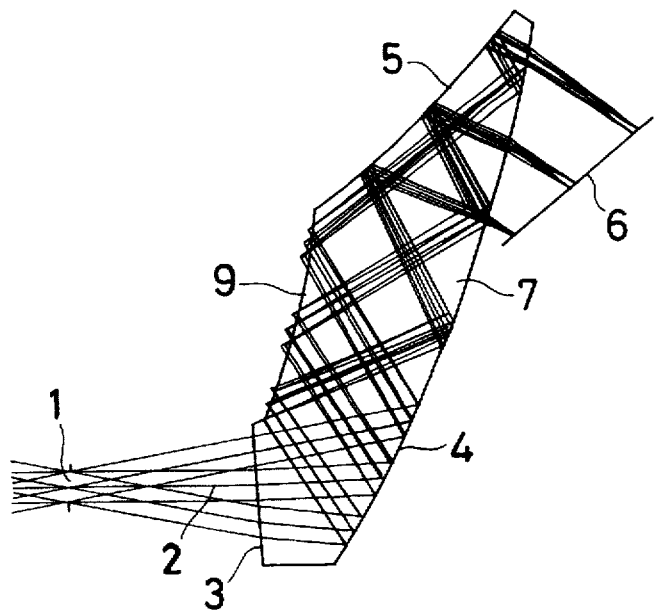
FIG. 15 is a sectional schematic of a further embodiment of the optical element to which the present invention is applicable.

In the case of FIG. 15, the optical element 7 consists of the first surface 3, second surface 4, third surface 5, and fourth surface 9, and a pencil of light emanating from the image display element 6 is incident on the optical element 7 upon refracted at the second surface 4 thereof, internally reflected at the third surface 5, incident on the second surface 4 for internal reflection, internally reflected at the fourth surface 9, again incident on the second surface 4 for internal reflection, and incident on the first surface 3 for refraction, so that it is projected into the eyeball of the observer with the iris position of the observer's pupil or the center of rotation of the eyeball acting as the exit pupil 1.

Figure 16:
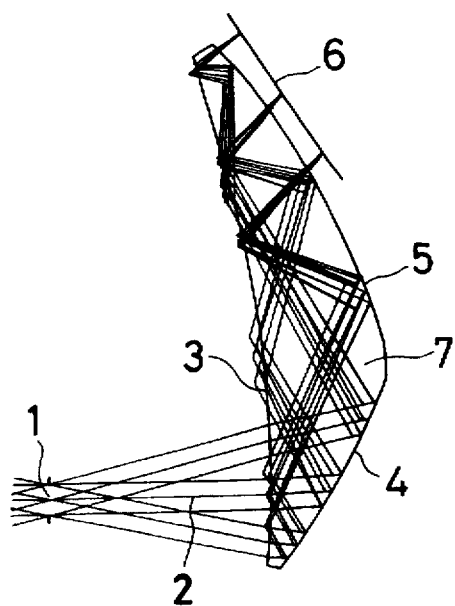
FIG. 16 is a sectional schematic of an yet further embodiment of an optical element to which the present invention is applicable.

Referring to FIG. 16, the optical element 7 of Example 5 is used, and a pencil of light emanating from the image display element 6 is incident on the optical element 7 upon refracted at the third surface 5 thereof, internally reflected at the first surface 3, again incident on the third surface 5 at which it is internally reflected, internally reflected at the first surface 3, reflected at the second surface 4, and once again incident on the first surface 3 for refraction, so that it is projected into the eyeball of the observer with the iris position of the observer's pupil or the center of rotation of the eyeball acting as the exit pupil 1.

Figure 17:
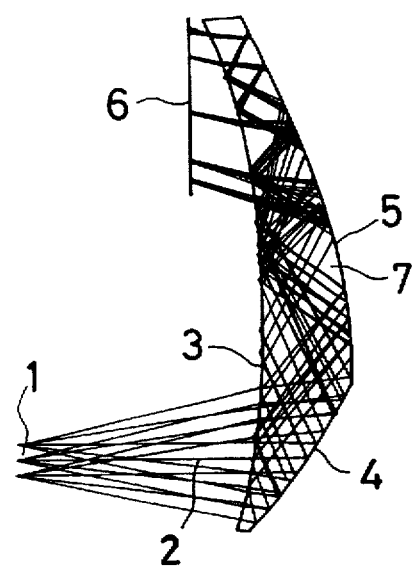
FIG. 17 is a sectional schematic of a still yet further embodiment of the optical element to which the present invention is applicable.
Figure 18:
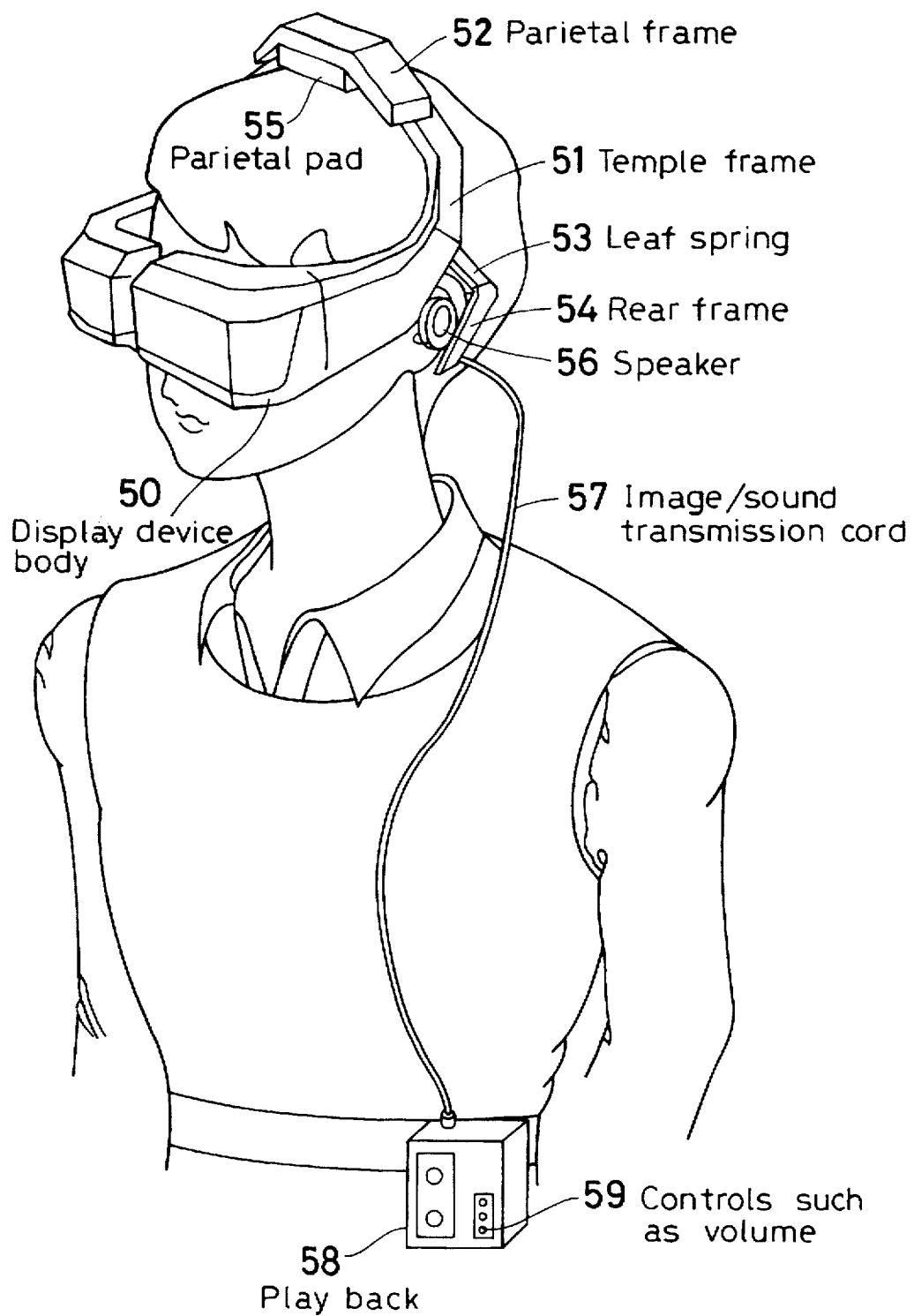
FIG. 18 is a general schematic of one embodiment of a head-mounted type of image display device making use of the optical system of the present invention.

In the case of FIG. 17, a pencil of light emanating from the image display element 6 is incident on the optical element 7 upon refracted at the first surface 3 thereof, internally reflected at the third surface 5, again incident on the first surface 3 at which it is internally reflected, incident on the third surface 5 at which it is again internally reflected, once again incident on the first surface 3 for internal reflection, reflected at the second surface 4, and over again incident on the first surface 3 for refraction, so that it is projected into the eyeball of the observer with the iris position of the observer's pupil or the center of rotation of the eyeball acting as the exit pupil 1.

The optical system comprising a single decentered prism element (optical element) including three or four optical surfaces with a medium — the refractive index of which is greater than 1 — filled between them and a diffraction optical element, wherein remnants of chromatic aberration, curvature of field, etc. in the optical element are corrected with the diffraction optical element, may be used in the form of an ocular optical system not only for monocular but also binocular observation. Binocular observation makes it possible for an observer to view images in a reasonable posture. In addition, if a parallactic image is presented to both eyes of an observer, it is then possible for the observer to view that image three-dimensionally. Moreover, if two sets of such ocular optical systems are mounted on the head of an observer by mounting means, it is then possible for the observer to view images in a comfortable position.

Such an ocular optical system according to this invention is used with an image display element in a set-up form. Two such sets are supported while they are spaced away from each other by an interpupillary distance to thereby construct a portable type of image display device such as a fixed or head-mounted type of image display device capable of viewing images with both eyes. One exemplary general construction of such a portable image display device is shown in FIG. 8. As illustrated, a display device body 50 includes a pair of two such sets of ocular optical systems and, in association with these, LCD image display elements located on an image plane. As shown, the device body 50 is provided on both the temples with continuous temple frames 51, which are connected to each other via a parietal frame 52. Between the temple frames 51 there is located a rear frame 54 via a leaf spring 53. The rear frame 54 is engaged with the rear sites of both ears of an observer, as is the case with the bows of glasses, while the display device body 50 is mounted on the head of the observer, whereby the display device 50 can be well held in front of the eyes of the observer. It is here to be noted that a parietal pad 55 formed of an elastic material such as sponge is contained in the inside of the parietal frame 52 and a similar pad is contained in the inside of the rear frame 54 as well, so that the observer can comfortably wear this display device on the head.

The rear frame 54 is additionally provided with a speaker 56 to enable the observer to hear stereophonic sounds while viewing images. The display device body 50 having the speaker 56 may be connected to a playback 58 such as a portable video cassette via an image/sound transmission cord 57, so that the observer can wear the playback 58 on any desired position of a belt or the like to enjoy images with sounds. Reference numeral 59 stands for volume switches or other controls of the playback 58. It is here to be noted that the parietal frame 52 has built-in electronic parts for image- and sound-processing circuits.

It is here to be noted that the cord 57 may have at a distal end a jack for connection with an existing video deck or the like. Further, the cord may be connected with a TV wave reception tuner to watch television or, alternatively, with a computer to receive computer graphics images or message images therefrom. Furthermore, an antenna may be used in place of such an awkward cord to receive external signals via electric waves.

Figure 19:
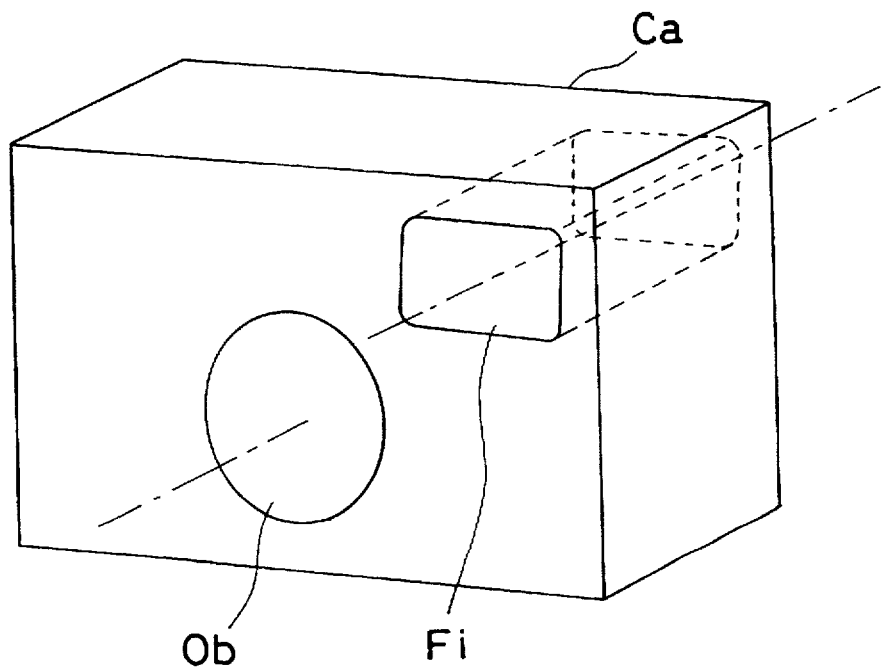
FIG. 19 is a layout schematic of the optical system according to the present invention when used as an image-forming optical system.
Figure 20:
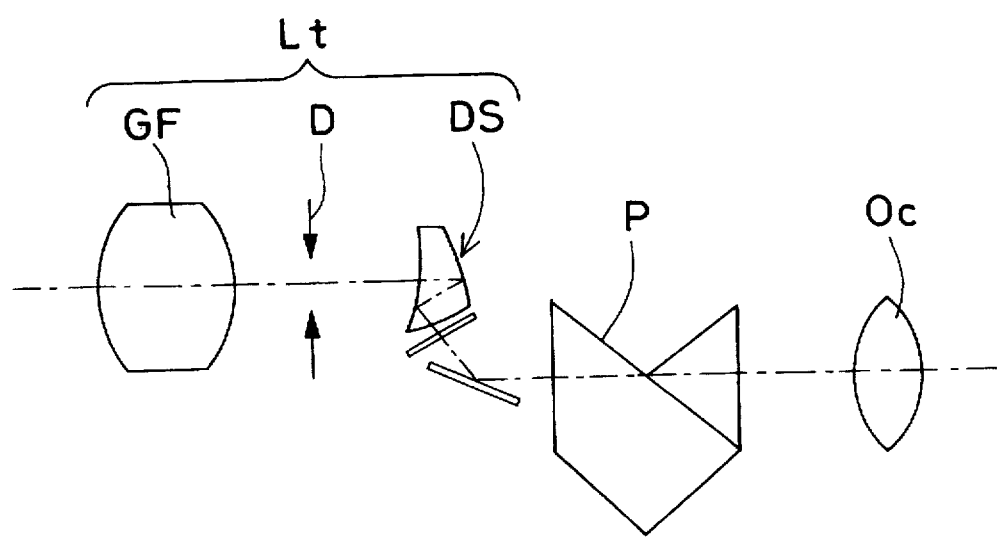
FIG. 20 is a layout schematic of the optical system according to the present invention when used as an image-forming optical system.
Figure 21:
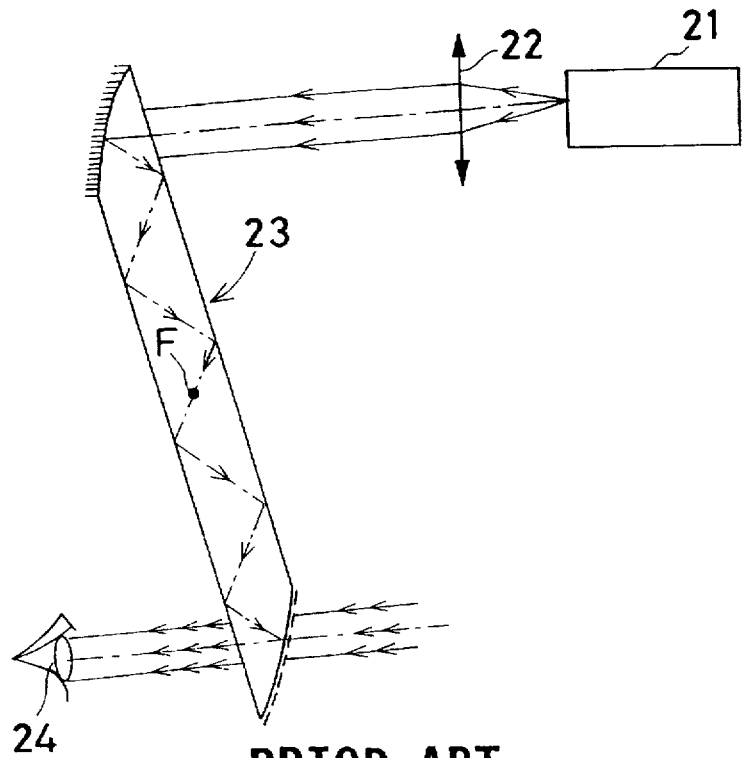
FIG. 21 is a schematic of one conventional optical system used on an image display device.
Figure 22:
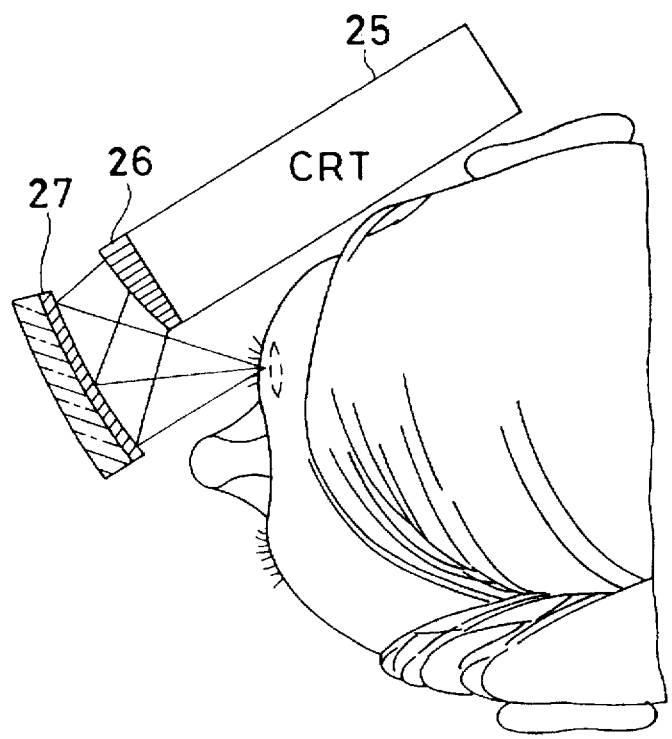
FIG. 22 is a schematic of another conventional optical system used on an image display device.

The optical system of this invention may be used in the form of an image-forming optical system. As illustrated in a perspective schematic or FIG. 19 as an example, this optical system may be used for a finder optical system Fi of a compact camera Ca in which the finder optical system Fi is provided separately from an image pickup optical system Ob. One exemplary general construction of such an image-forming optical system is shown in FIG. 20. In this case, an objective optical system Lt may be constructed of a front lens group GF, an aperture stop D, and an optical system DS of this invention which is located in the rear of the stop D. An image formed by this objective optical system Lt is erected by a four-reflection Porro prism P located on an observer side of the system Lt, so that it can be viewed through an eyepiece lens Oc.

The optical system of this invention has been described with reference to some examples; however, it is understood that the present invention is in no sense limited to such examples, and many other modifications may be possible.

As can be understood from the foregoing, the present invention makes it possible to achieve an optical system suitable for an image-forming optical system that is compact and light in weight, and corrected in terms of aberrations, as well as for an ocular optical system for a head- or face-mounted type of image display device.

What we claim is:

1. An optical system comprising an optical element and a diffraction optical element, both said elements being mutually decentered, wherein said optical element comprises at least three juxtaposed optical surfaces, at least one of said at least three optical surfaces being defined by a curved surface, and at least two reflections occurring between said optical surfaces.

2. The optical system according to claim 1, wherein a space defined by said at least three surfaces is filled with a transparent medium having a refractive index greater than 1.

3. The optical system according to claim 1, which further includes an image display element having a display surface for displaying an image, said display element being located such that a light ray emerging from said image display element is incident on said optical system and upon transmission through a first transmitting surface of said optical element located in opposition to said display surface, is reflected at a first reflecting surface and at a second reflecting surface of said optical element, so that said light ray is guided to an eyeball of an observer upon transmission through a second transmitting surface of said optical element.

4. The optical system according to claim 3, wherein the image displayed on said image display element is guided to the eyeball of the observer without being formed as an intermediate image.

5. The optical system according to claim 1 or 3, herein a curvature of one of said at least three optical surfaces within planes of decentration of said three surfaces is different from that within planes perpendicular thereto.

6. The optical system according to claim 3, wherein aid first reflecting surface and said transmitting surface re constructed of surfaces of the same shape at the same location.

7. The optical system according to claim 6, wherein said first reflecting surface and said second transmitting surface constructed of the surfaces of the same shape at the same location are positioned such that a light ray is incident on one optical path at an angle larger than a critical angle in which the light ray is reflected, and is incident on another optical path at an angle of incidence smaller than the critical angle through which the light ray is transmitted.

8. The optical system according to claim 3, wherein said second reflecting surface is decentered with respect to a principal ray with the proviso that said principal ray is defined by a light ray emerging from a center of said display surface and transmitting through said eyeball.

9. The optical system according to claim 3, wherein said second reflecting surface is comprised of a concave surface that is concave on an eyeball side.

10. The optical system according to claim 3, wherein an aberration produced at the transmitting surfaces of said optical element is opposite in sign to an aberration produced at said diffraction optical element.

11. The optical system according to claim 3, wherein said diffraction optical element is located between said optical element and the eyeball of the observer.

12. The optical system according to claim 3, wherein said diffraction optical element is located between said optical element and said display surface.

13. The optical system according to claim 11 or 12, which satisfies the following condition $$-0.1 < 1/f < 0.1 (\text{mm}^{-1}) \quad (1)$$

where f is a focal length of said diffraction optical element.

14. The optical system according to claim 11, which, when said diffraction optical system is located between said optical element and the eyeball of the observer, conforms to the following condition $$-0.1 < 1/f < 0.1 (\text{mm}^{-1}) \quad (2)$$

where f is a focal length of said diffraction optical element.

15. The optical system according to claim 12, which, when said diffraction optical element is located between said optical element and said display surface, conforms to the following condition $$-0.05 < 1/f < 0.05 (\text{mm}^{-1}) \quad (3)$$

where f is a focal length of said diffraction optical element.

16. An image display device, which includes a locating means for locating an eyeball of an observer at a pupil position of the optical system recited in claim 1 or 3.

17. The image display device according to claim 16, wherein said locating means enables said optical system to be mounted on a head of the observer.

18. An image pickup optical system, wherein an image recording means is located in place of said image display element of the optical system recited in claim 3, and a stop is located at a position of said eyeball in place of said eyeball.

* * * * *